US011003387B2

(12) United States Patent
Markus et al.

(10) Patent No.: US 11,003,387 B2
(45) Date of Patent: May 11, 2021

(54) COMBINED DATA AND CONTROL FOR MULTI-DIE FLASH

(71) Applicant: Western Digital Technologies, Inc., San Jose, CA (US)

(72) Inventors: Yoav Markus, Tel-Aviv (IL); Alexander Bazarsky, Holon (IL)

(73) Assignee: WESTERN DIGITAL TECHNOLOGIES, INC., San Jose, CA (US)

(*) Notice: Subject to any disclaimer, the term of this patent is extended or adjusted under 35 U.S.C. 154(b) by 167 days.

(21) Appl. No.: 16/053,695

(22) Filed: Aug. 2, 2018

(65) Prior Publication Data

US 2019/0163397 A1 May 30, 2019

Related U.S. Application Data

(63) Continuation-in-part of application No. 15/824,658, filed on Nov. 28, 2017, now Pat. No. 10,235,309.

(51) Int. Cl.
*G06F 3/06* (2006.01)
*G06F 13/16* (2006.01)
*G06F 13/42* (2006.01)

(52) U.S. Cl.
CPC .......... *G06F 3/0659* (2013.01); *G06F 3/0604* (2013.01); *G06F 3/0679* (2013.01); *G06F 13/1642* (2013.01); *G06F 13/1668* (2013.01); *G06F 13/4282* (2013.01)

(58) Field of Classification Search
CPC .... G06F 3/0659; G06F 3/0604; G06F 3/0679; G06F 13/1642; G06F 13/1668; G06F 13/4282; G06F 3/061; G06F 3/0658; G06F 3/0688

USPC .............................. 710/33, 36, 38, 107, 220
See application file for complete search history.

(56) References Cited

U.S. PATENT DOCUMENTS

| | | | | |
|---|---|---|---|---|
| 9,236,128 B1* | 1/2016 | Louie | ................. | H01L 27/1157 |
| 9,721,672 B1* | 8/2017 | Dutta | ................. | G11C 16/0483 |
| 9,805,769 B2* | 10/2017 | Lee | ................. | G11C 11/4072 |
| 9,865,357 B1* | 1/2018 | Thimmegowda | ........ | G11C 8/08 |
| 10,026,478 B1* | 7/2018 | Choi | ................. | G11C 13/004 |
| 2004/0228196 A1* | 11/2004 | Kwak | ................. | G11C 5/063 |
| | | | | 365/230.03 |
| 2005/0060601 A1* | 3/2005 | Gomm | ................. | G11C 23/00 |
| | | | | 714/5.1 |
| 2007/0263440 A1* | 11/2007 | Cornwell | ............ | G11C 11/5621 |
| | | | | 365/185.03 |
| 2008/0082707 A1* | 4/2008 | Gupta | ................. | G06F 13/1615 |
| | | | | 710/110 |
| 2008/0297199 A1 | 12/2008 | Grunzke | | |

(Continued)

*Primary Examiner* — Idriss N Alrobaye
*Assistant Examiner* — Henry W Yu
(74) *Attorney, Agent, or Firm* — Patterson & Sheridan, LLP; Steven H. Versteeg

(57) ABSTRACT

An arrangement for providing a combined data and control signal for a multi die flash, comprising, a memory arrangement, the memory arrangement comprising at least two dies, a controller configured to send and receive signals to the memory arrangement and a common line connected to the memory arrangement and the controller and configured to transmit the signals from the controller to the at least two dies, wherein the arrangement is configured to provide a combined data and combined control signals to the multi-die flash.

27 Claims, 8 Drawing Sheets

(56) References Cited

U.S. PATENT DOCUMENTS

| | | | |
|---|---|---|---|
| 2011/0037628 A1* | 2/2011 | Petrovic | H03M 1/1038 341/118 |
| 2011/0157981 A1* | 6/2011 | Sharon | G11C 16/26 365/185.03 |
| 2014/0289448 A1* | 9/2014 | Koudele | G11C 7/1066 711/103 |
| 2015/0187399 A1 | 7/2015 | Tuers et al. | |
| 2015/0331817 A1* | 11/2015 | Han | G11C 5/04 710/308 |
| 2015/0338905 A1* | 11/2015 | Henry | G11C 7/20 711/119 |
| 2015/0356048 A1* | 12/2015 | King | G06F 13/376 710/308 |
| 2017/0123974 A1* | 5/2017 | Yi | G06F 3/061 |
| 2018/0314587 A1* | 11/2018 | Barber | G06F 3/0659 |

* cited by examiner

COMBINED DATA AND CONTROL FOR MULTI-DIE FLASH

CROSS-REFERENCE TO RELATED APPLICATIONS

This application is a continuation in part of co-pending U.S. patent application Ser. No. 15/824,658, filed Nov. 28, 2017. Each of the aforementioned related patent applications is herein incorporated by reference.

BACKGROUND OF THE DISCLOSURE

Field of the Disclosure

Aspects relate to capacity and throughput capability of memory arrangements. More specifically, aspects relate to providing methods and apparatus for combined data and control of multi-die flash arrangements.

Description of the Related Art

The capacity of memory arrangements is constantly being improved as technology increases. Throughput of memory arrangements is also required to be increased as ever increasing processing speeds require data to be supplied at high rates of speed. In order to meet these needs, manufacturers of memory arrangements seek cost effective ways in increase both capacity and data throughput for their devices.

A simple method to increase the capacity and throughput of a memory arrangement, such as a solid state drive ("SSD"), is to either provide a larger amount of silicon for increased memory or to provide duplicate lines and dies for reading the larger amounts of silicon. While these arrangements may be acceptable for some applications, adding larger amounts of silicon in applications where a silicon footprint is limited is not possible. Moreover, adding duplicate lines for data transfer also provides problems.

Referring to FIG. 1, a conventional approach to increasing throughput for a memory arrangement 100 is disclosed. The arrangement 100 illustrated has four die sets D0 104, D1 106, D2 108 and D3 110. A controller 102 is connected to each of the four dies sets D0 104, D1 106, D2 108 and D3 110. To increase throughput, four duplicate lines 112, 114, 116 and 118 are provided between the controller 102 and the respective die set 104, 106, 108 and 110. To accept the lines 112, 114, 116 and 118, a die pad must be added to the controller 102 to provide the appropriate connection. Such connections and multiple lines 112, 114, 116 and 118 require considerable space within the device for which the installation is intended.

The addition of multiple lines and increased die pads is contrary to what is needed in the industry. As an example, applications that require a strict form factor may be electronic devices that accompany a cellular telephone or smart phone. Built-in memory arrangements, such as smart phones that use iNAND arrangements are becoming increasingly prevalent in the industry as computing needs are needed by traveling individuals. The limited overall size of the products, however, necessitates small form factors which do not accommodate the multiple lines and increased die pads.

As form factors for certain applications have already been set between manufacturers in an attempt to standardize overall size, adding to these form factors is not possible or, at a minimum, extremely difficult to change as different device manufacturers must agree to the intended change. There is a need, therefore, to provide for memory arrangements that will allow for increased memory capacity without sacrificing form factor requirements of today's devices.

There is a further need to provide for memory arrangements that have increased throughput speed, compared to conventional apparatus, without sacrificing form factor requirements.

There is a still further need to provide for a memory arrangement that is cost effective to manufacture while maintaining capacity and throughput requirements.

SUMMARY OF THE DISCLOSURE

The following summary is provided for describing aspects of the disclosure and should not be considered limiting of the scope of the aspects described.

In one non-limiting embodiment, an arrangement for providing a combined data and control signal for a multi die memory is disclosed comprising a memory arrangement, the memory arrangement comprising at least two dies, a controller configured to send and receive signals to the memory arrangement; and a common line connected to the memory arrangement and the controller and configured to transmit the signals from the controller to the at least two dies, wherein the arrangement is configured to provide a combined data and combined control signals to the multi-die flash.

In another non-limiting embodiment, a method to operate a multi-die flash is disclosed comprising: receiving data in a memory arrangement at a controller for the multi-die flash, wherein the data includes a request to perform a command at the memory arrangement, generating a command at the controller to perform at the multi-die flash, wherein separate command and separate data for at least two dies are combined in the generated command, transmitting the command from the controller to the at least two dies of the memory arrangement over a single line, receiving the command at the at least two dies and performing the command at the at least two dies of the memory arrangement.

In another non-limiting embodiment, a memory arrangement is disclosed comprising: means for receiving the data from the host at the controller for the multi-die flash, means for generating a command at the controller to perform at the multi-die flash, means for transmitting the command and data from the controller to at least one die of the memory arrangement over a single line, means for receiving the command and data at the at least one die and means for performing the command at the at least one die of the memory arrangement.

In another non-limiting embodiment, a method to perform a command and simultaneously send data to a multi-die solid state drive is disclosed comprising receiving data including a request at a controller within the multi-die solid state drive, generating a command at the controller to perform at the multi-die solid state drive, transmitting the command and data from the host, over a single line, to at least two die of the solid state drive, receiving the command from the controller and the data at the at least two die and performing the command at the at least one die of the solid state drive.

A method to perform a command and simultaneously send data to a multi-die flash memory arrangement, comprising: receiving the data including a request at a controller connected to the multi-die flash memory arrangement, generating a command at the controller to perform at the multi-die flash arrangement, determining a direction of transmission of data over a single line connected to the controller and the multi-die flash arrangement, determining when to transmit the command and data from a host according to a clock synchronization arrangement, transmitting the command and data from the host to at least two die of the flash memory arrangement at a time determined by the clock synchronization arrangement, wherein the transmitting occurs over the common line a single connection between the controller and the at least one die and the transmitting includes a combined control portion and a combined data portion, receiving the command from the controller and the data at the at least two die, and performing the command at the at least two die of the flash memory arrangement.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
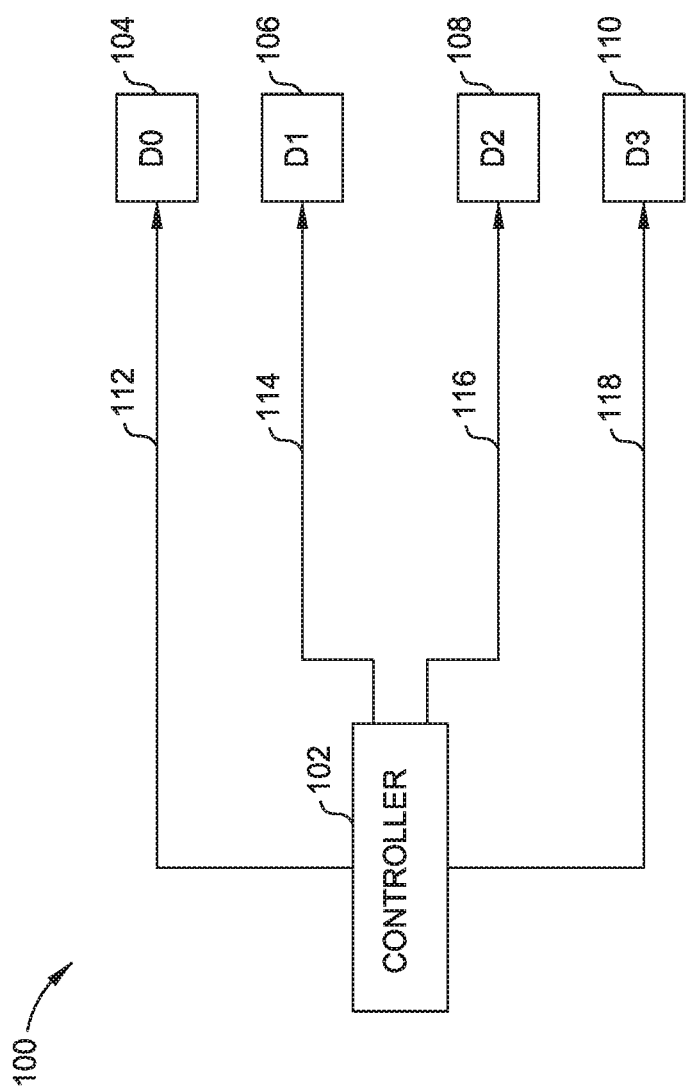
FIG. 1 illustrates a conventional approach to increasing throughput of a controller die combination.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art that some embodiments may be practiced without many of these details and that numerous variations or modifications from the described embodiments are possible. As used herein, the terms "above" and "below", "up" and "down", "upper" and "lower", "upwardly" and "downwardly", and other like terms indicating relative positions above or below a given point or element are used in this description to more clearly describe certain embodiments.

Aspects of the present disclosure relate to computer operations and computer storage and specifically, enhancing operations of a storage device that is connected to a computer host. The function of the memory arrangement is to accept data and store the data until needed again by a user or the host. The arrangement may be configured to accept bursts of data, depending on the computer process performed, therefore the data storage arrangement is configured with multiple memory units that provide for various states of usage. Certain sections of the data storage arrangement are configured of memory systems that provide for fast action (low latency) so that computer processes may be conducted at a rapid pace. Such low latency performance may be accomplished by single layer cell (SLC) memory configurations. If bulk amounts of data are required to be stored, multiple layer cell memory configurations may also be present, such as triple level cell (TLC) memory configurations. The data storage arrangement may have an interface that allows the data storage arrangement to connect with the host computer. The interface may be a SAS Interface or Serial ATA (SATA) compatible interface, as a non-limiting embodiment. The memory storage may have a configuration to allow for plug and play capability. Although described as having a SATA compatible interface, the memory storage device may be provided with a configuration which allows for access by wireless technology. In one non-limiting embodiment, 802.11ac technology may be used to provide for fast performance for smooth streaming. Wireless technology may use, for example, between 2.5 GHz to 5 GHz frequencies for connection. In some embodiments, the storage may allow users to choose the frequencies for wireless connection. While being described as SATA compatible, other types of interfaces may be used.

Auxiliary connections may be provided to the data storage arrangement to allow for additional options for inputting data directly to the data storage arrangement without interfacing with the host. Such direct input of data may be provided through placement of an integrated secure digital card to offload or copy data. Other auxiliary connections may be provided for additional input/output operations. Such connections may be USB 2.0, USB 3.0, Firewire or other hard wired configurations. Gigabit Ethernet interfaces and connections may also be used.

The data storage arrangement may be configured with a separate power supply or may be run through other power supply, such as from a computer mother board. In some embodiments, an internal battery may be provided to power the data storage arrangement as an independent entity. Such configurations may be provided such that the data storage arrangement is a portable unit. In such data storage arrangement configurations, the power supply means may be sufficient to power a host and/or charge a host, such as a mobile cellular phone, personal computer, tablet, camera or other configuration. The data storage arrangement may also have a battery indicator to allow a user to understand the amount of charge in the data storage arrangement from a visual inspection. Such battery indicators may be, for example, low energy consumption light emitting diode technology. In specific embodiments, the data storage arrangement may be provided with a circuit to allow for charging and prevent overcharging of the system if the data storage arrangement is connected to an outside power supply for an extended period. In some embodiments, circuitry may be used to determine if a threshold of inactivity has been reached for the storage system, thereby causing the system to enter a low power consumption mode, conserving battery power.

In one non-limiting embodiment, a controller is provided to control actions of the data storage arrangement as required by the host. The controller may also be configured to perform maintenance activities for the data storage arrangement to allow for efficient use. The controller, for example, may be an application specific integrated circuit (ASIC) or other configuration that accepts commands from a host and then controls operations of the solid state drive or memory arrangement.

Internal software may be provided with the data storage arrangement to allow for efficient storage and read capability of data on the system. Such internal software may be used such that the data storage arrangement can be used as a portable media server to wirelessly stream media to a host or output device. Such output devices may include, but not be limited to, smart televisions, smart phones, stereo audio system. The internal software may also be provided such that the access of data may be performed by cloud applications designed for interface with the data storage arrangement.

The internal software of the data storage arrangement may also be configured to provide for security of the data storage arrangement. Safeguarding of material provided on the data storage arrangement prevents unauthorized access to sensitive information contained on the system. Security protocols may take several forms. Protocols may be in the form of password protection, such as a Wi-Fi password protection. In embodiments, software may be used in conjunction with the data storage arrangement to allow the data storage arrangement to create a hardware lock. Such hardware locks, for example, may prevent access to a host computer through a universal serial bus connection.

Memory arrangement software may also provide other benefits. Such benefits can include diagnostic support of the memory arrangement. Data obtained may be directly supplied to a user or may be fed into other types of software that may analyze obtained data. In one example configuration, two different modes may be provided. A first mode may provide a quick test software program and may be provided with the capability to check the data storage arrangement for major performance problems. A second mode may provide a full test mode which may also be used to provide detailed status information to a user. Data may be provided to the user which may include, for example, a firmware version of the software, a total amount of memory of the data storage arrangement, the amount of memory storage used, storage divisions provided on the data storage arrangement, memory block errors, energy usage, age of the device and similar data.

The internal software may also be used as a server system wherein in certain embodiments, Digital Living Network Alliance (DLNA) enabled software is incorporated. Such software allows for quick file transfer and error checked operation as a server. In some embodiments, the internal software may be provided with the capability to use file transfer protocol (FTP) to enable the transfer of content to and from the memory storage in public access folders. The data storage arrangement may also provide for either a secured log in or an anonymous login capability.

In specific embodiments, the data storage arrangement may be configured such that the system interacts with cloud storage systems or other data storage systems. In the event that the data storage arrangement approaches the limits of storage capability, the data storage arrangement may allow for some of the data to be stored on cloud based systems or other data storage systems. Selection of the data to be stored on such external storage systems may be governed by the controller which is configured to determine what sections of data may be appropriately stored in cloud based systems to minimize latency for users. The storage system may have a unique identifier MAC address and device name to allow the system to operate on an independent basis. The storage system may also be operated in a configuration that allows for the system to clone a MAC address of a computer that is attached.

The overall capacity of the data storage arrangement may vary according to the different embodiments provided. Capacities 1 TB, 2 TB up to 64 TB may be provided, as non-limiting embodiments. Different form factors may also be provided. A form factor of 2.5 inches may be provided. Other form factors such as 1.8 inch or 3.5 inch may also be used. Compatibility of the data storage arrangement may be provided for Windows operating systems, Windows Server, Linux and Mac OS, as non-limiting embodiments. Example Windows operating systems that may use the system may be Windows 10, Windows 8 and Windows 7. Example Mac OS systems may be Lion (Mac OSA 10.7), Mountain Lion (Mac OS 10.8), Yosemite (Mac OS 10.10), El Capitan (Mac OS 10.11), Sierra and Mavericks as non-limiting embodiments. Supported browsers for the storage system may be, in non-limiting embodiments, Internet Explorer, Safari, Firefox and Google Chrome.

Software may also be included in the system to allow for quick and automatic backups of data according to user prescribed requirements. Such backup ability may be compliant with Windows based backup and restore functions and/or Apple Time Machine requirements. Furthermore, software may be provided to add more than one user to the storage system. Users can be added or deleted according to an administration account. Such administration account may also allow for restricted access for certain users according to administration requirements.

Figure 2:
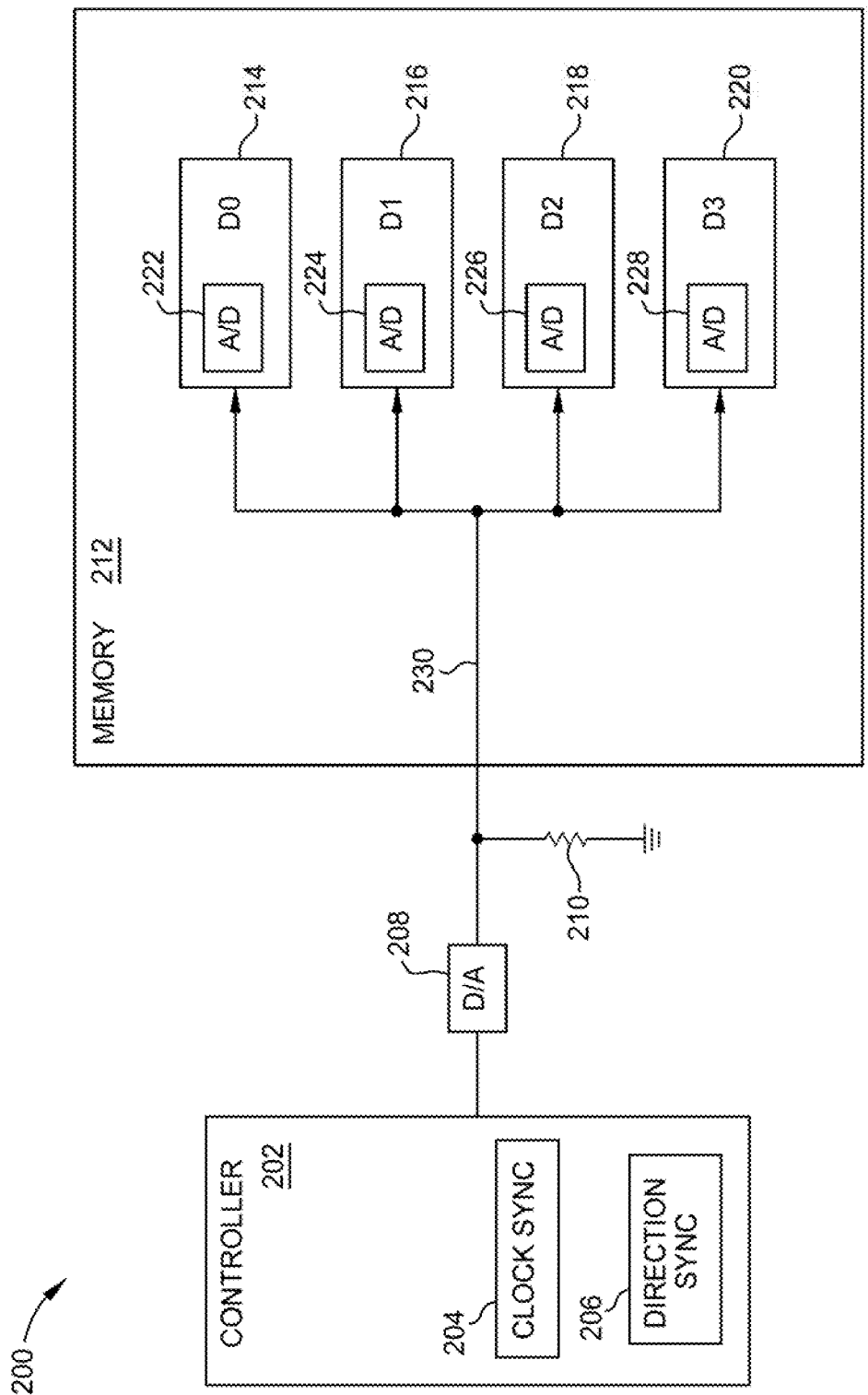
FIG. 2 is a schematic diagram of a controller and memory arrangement using a common line configuration for a write path.

Referring to FIG. 2, a schematic diagram 200 of a controller 202 and memory arrangement 212 using a single line 230 configuration is illustrated for a write path. The controller 202 is connected to the memory 212 through a digital to analog converter 208. The controller 202 is used to control operations of the memory 212, such as reading and writing of data to the memory 212. The memory 212 may be made of silicon material configured to store data, as a non-limiting embodiment. The memory 212 may be a flash unit to allow for non-volatile activity. Non-volatile memory is defined, for example, as a memory type that retains data even when an electrical supply is disconnected from the memory system. In this embodiment, an aggregation of separate lines of the conventional apparatus, as disclosed in FIG. 1, is performed with a single line 230. To aid in operation of the digital to analog converter 208 and the analog to digital converter 222, 224, 226, 228, each die is designated by a current proportional to $2n$ where n is the dies number in the die stack. As the current is proportional as described above, data from each of the dies D0 214, D1 216, D2 218 and D3 220 may be distinguished from the other respective dies.

In the illustrated embodiment, four different die D0 214, D1 216, D2 218 and D3 220 are provided. The die D0 214, D1 216, D2 218 and D3 220 provide for entry and exit points for data to be written and read from the memory 212. In this embodiment, each die D0 214, D1 216, D2 218 and D3 220 is provided with an analog to digital converter 222, 224, 226, 228. The analog to digital converters 222, 224, 226, 228 are fed from the single line 230 that accepts data from a digital to analog converter 208 that converts data received from the controller 202. The single line 230 is further connected to ground through a resistor 210. The controller 202 is provided with a clock sync 204 arrangement and a direction synch arrangement 206.

Aspects of the disclosure provide a way to combine data signals and control signals into an aggregated signal. The aggregated signal may be broadcast to all dies at the same time and each die will receive a distinct signal based on its identity, by a dedicated hardware circuit. This approach reduces the need to add multiple input/output ("I/O") pads which reduces the cost of such a high throughput system, and enables an implementation in devices with package restrictions, such as iNAND.

In one non-limiting embodiment, an aspect of the disclosure requires synchronization for data exiting and entering the controller 202. Such synchronization is provided by a clock synchronization 204 and a direction synchronization arrangement 206. This synchronization allows for signals to be sent and received with minimal interference and a maximum of efficiency. The single line 230 is used to transmit the synchronized signals. As data is transmitted at high rates compared to control signals, for example, care is taken to synchronize different channels on a clock basis.

The controller in FIG. 2 may send a signal that incorporates several levels of voltage to the die index to which the data is intended to go. The analog to digital converter 222, 224, 226, 228 in each of the dies will then transform the signal into a digital signal, discerning between the dies and targeting each of the dies with its intended signal.

In the embodiment provided in FIG. 2, the clock synchronization arrangement 204 and the direction synchronization arrangement 206 are embedded into the controller 202 to control the clock frequency of all the combined data lines through the common line 230 and the direction of the data lines (either read or write).

Figure 3:
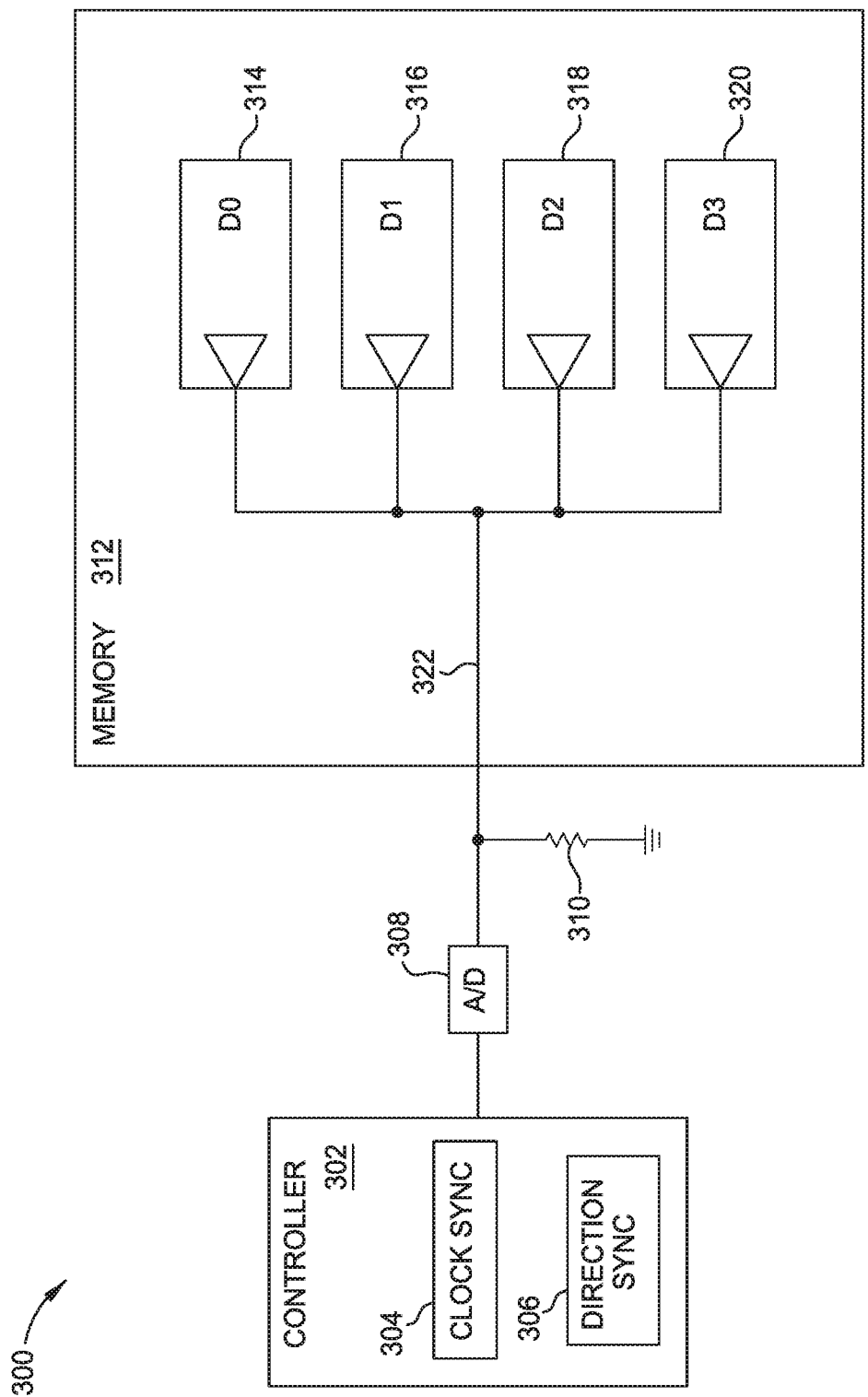
FIG. 3 is a schematic diagram of a second embodiment of a controller and memory arrangement using a common line configuration on a read path.

In another configuration, an aspect of the disclosure provides for a read path as well. In this embodiment, provided in FIG. 3 provides for an enhanced read configuration 300. A controller 302 is connected to a memory 312 through a common line 322 and an analog to digital converter 308. The single line 322 is also connected to ground through a resistor 310. The common line 322 is also connected to die arrangements D0 314, D1 316, D2 318 and D3 320.

The controller 302 is configured with a clock synchronization arrangement 304 and a direction synchronization arrangement 306. When activated, the direction synchronization arrangement 306 allows data to be transferred on a specific direction, either to or away from the controller 302. The clock synchronization arrangement 306 is used to allow transfer of data at specific time periods, thereby eliminating interference that may develop for non-synchronized data transfers. As will be understood, the read path arrangement is essentially a reversed conversion scheme from the write path arrangement provided in FIG. 2.

Figure 4:
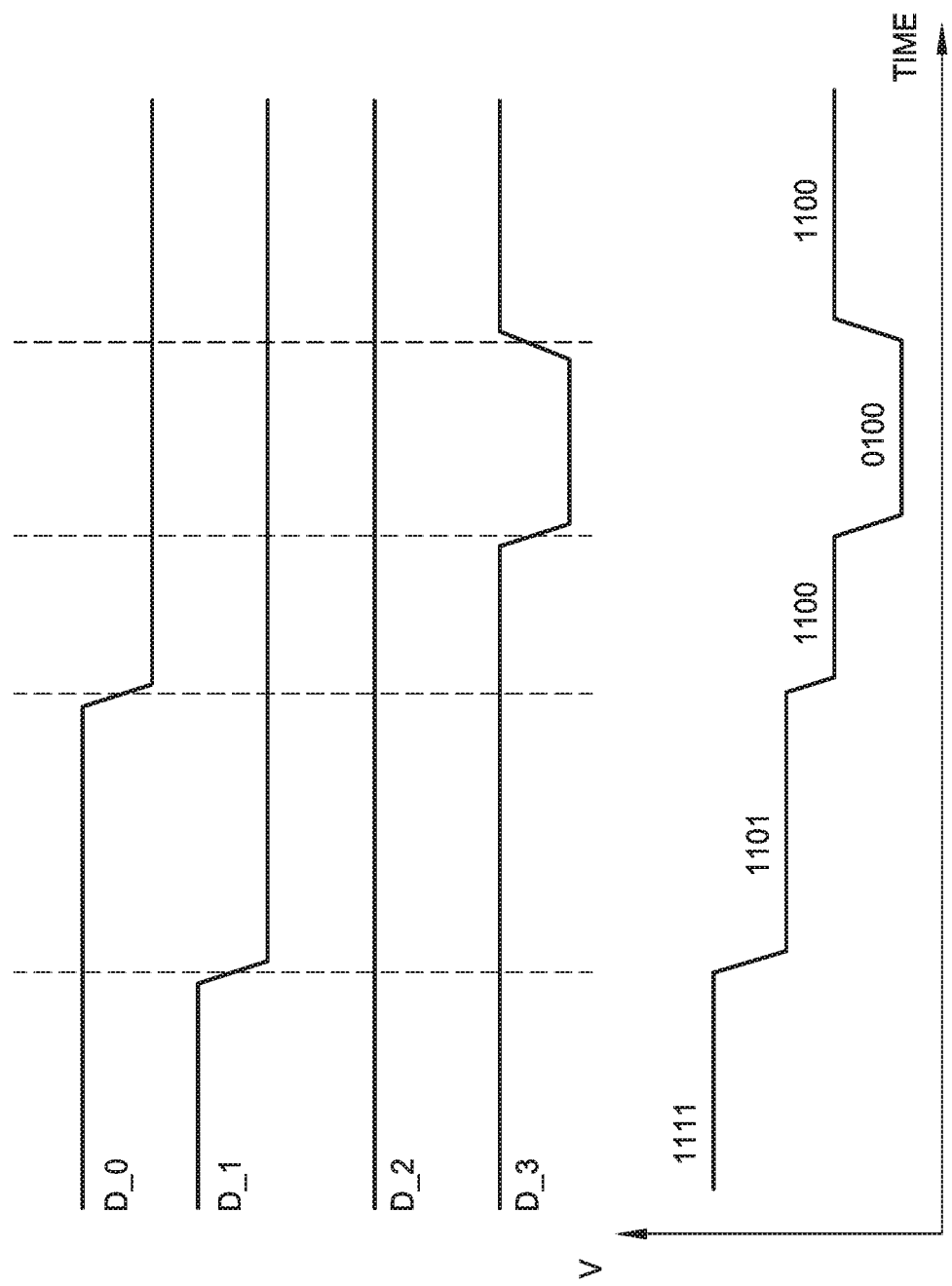
FIG. 4 is a graph of data signals over time for combined and individual die of an example controller and memory arrangement using a common line configuration.

Referring to FIG. 4, a combined voltage data signal is presented in the lower part of the graph for the arrangement of FIG. 2. For die D_3, in the first graph above the combined voltage data signal, the value of voltage is one (1) across three (3) time periods, then zero (0) across one and then increased to a voltage of one (1) for the final time period. For die D_2, the voltage is a constant valve of one (1) for all time periods. For die D_1, the voltage is the value one (1) for one time period and then zero for all remaining time periods. For die D_0, the voltage is the value of one (1) for two time periods and then the value of zero for the remainder of the time periods. The values on the lower portion in the voltage vs. time graph, therefore are read over time as values (D_3, D_2, D_1, D_0). Combining the above voltages over the times provided yields values of (1111) for time period 1, (1101) for time period 2, (1100) for time period 3, (0100) for time period 4 and (1100) for time period 5.

Figure 5:
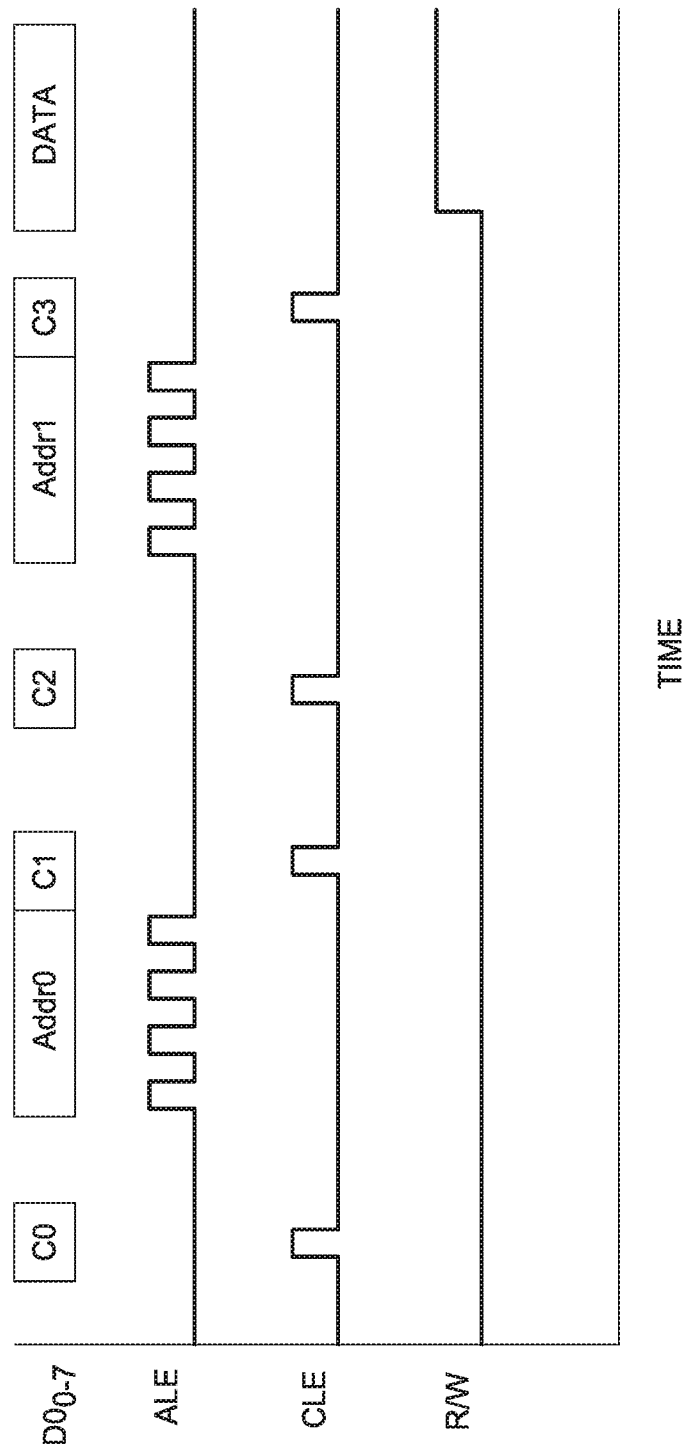
FIG. 5 is a graph of data and control signals over time used for corresponding controls of architecture.

FIG. 5 depicts the conventional way of communicating with multiple dies, one at a time. The value Addr0 represents a first die and Addr1 represents a second die. Aspects of the disclosure, however may multiplex C0+C2 together, Addr0+Addr1 together and C1+C3 together into one combined transaction. The timeline would be half the current timeline, consisting of just one transaction (combined command, combined address, another combined command then the combined data. The portion of the graph labeled ALE is a control line that indicates that a current address is passed on the bus (single line). As provided, the ALE portion of the graph has a first portion of no signal, followed by a pulsating signal portion, a no signal portion, a second pulsating signal portion and a no signal portion. The portion of the graph labeled CLE indicates that a command is passed on the bus (single line) and provides a relatively different signature. The CLE control line provides non-periodic activities of no signal and interspersed signals. The R/W portion of the graph is a control that indicates whether data is read or written. The R/W portion has a first section of no signal followed by a second section of signal. In current architecture, data sent to several dies is passed sequentially through each of the control lines representing an "OR" function on all the dies, without indication to the die identity. This embodiment provides that these controls are combined for different dies, in a fashion similar to the embodiment provided in FIG. 2.

To avoid signal integrity or timing difficulties, the granularity in which signals may start transmission may be predefined. For example, if a granularity is defined to be 1 μS, signals may only start transmitting in multiples of 1 μS. The granularity may be a function of a clock cycle. As a result, control signals may be differentiated based upon the known granularity of the data provided.

Figure 6:
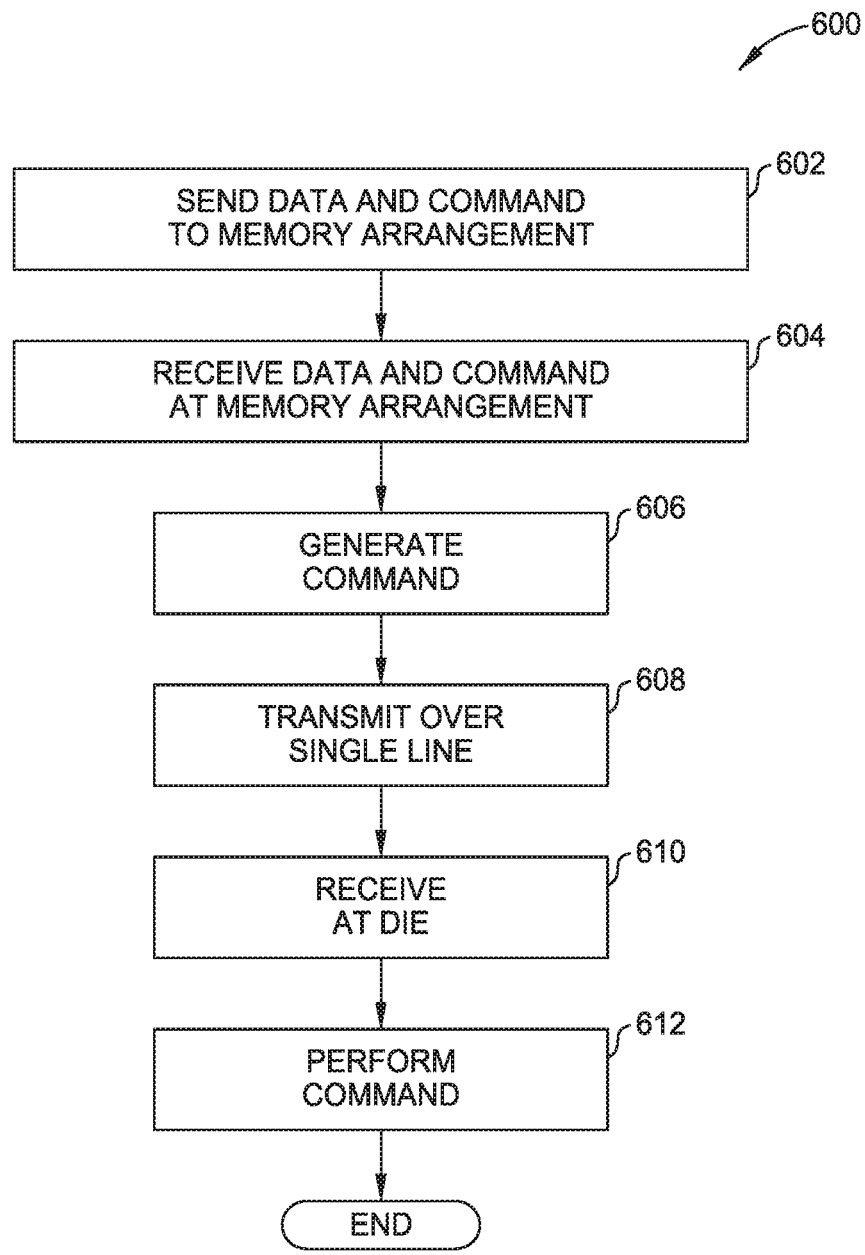
FIG. 6 is a flow chart for one example embodiment for a method for combined data and control for a multi-die flash.

Referring to FIG. 6, a method 600 for operating a multi-die flash is illustrated. At 602, data is sent from a host to a memory arrangement, wherein the data includes a request to perform a command at the memory arrangement. The host may be, for example, a computer. At 604, the data is received from the host at the controller for the multi-die flash. At 606, a command is generated at the controller to perform at the multi-die flash. The operation may be, for example a write or read operation. At 608, the command and data from the controller are transmitted over a single line to at least one dies of the memory arrangement. At 610, the command and data are received at the at least one die. At 612, the command is performed at the at least one die of the memory arrangement.

Figure 7:
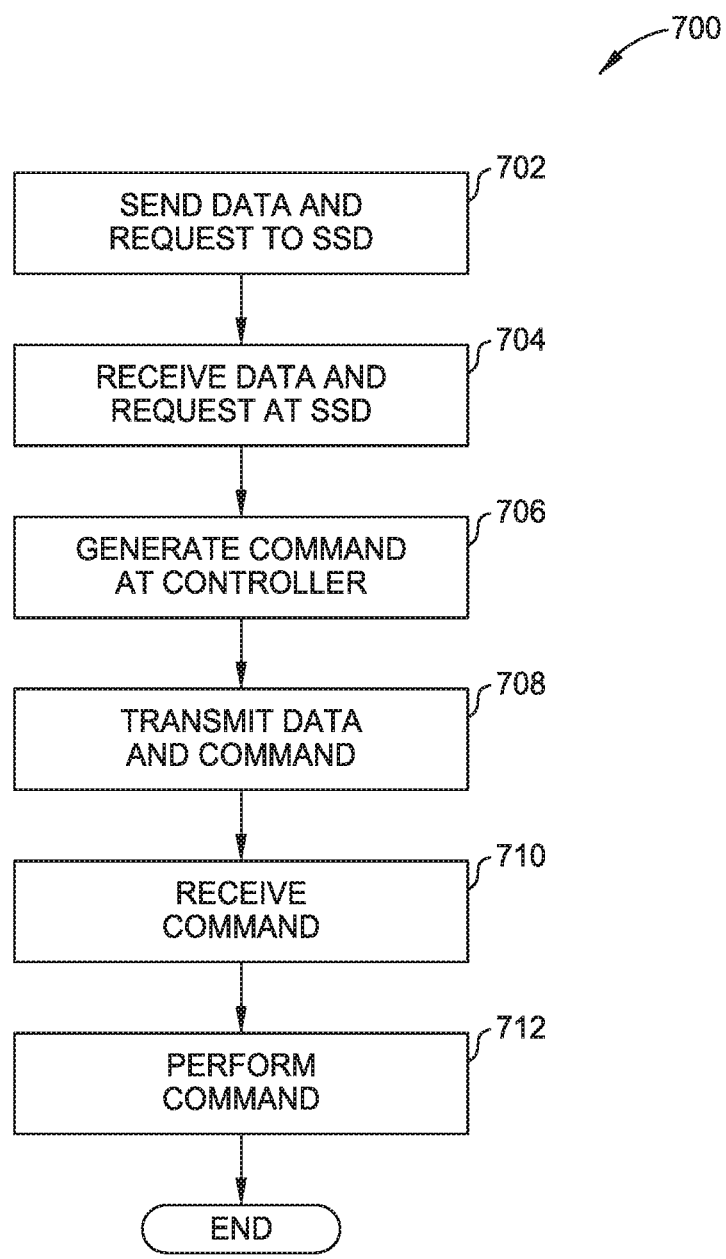
FIG. 7 is a flow chart for a second example embodiment for a method for combined data and control for a multi-die flash.

Referring to FIG. 7, another example method 700 is illustrated. This method 700 is provided to perform a command and simultaneously send data to a solid state drive. At 702, the method provides for sending data and a request to perform a command from a host to the solid state drive. At 704, the method further provides for receiving the data and the request from the host at a controller within the solid state drive. At 706, the method provides for generating a command at the controller to perform at the multi-die solid state drive. At 708, the method further provides for transmitting the command and data from the host to at least one die of the solid state drive, wherein the transmitting occurs over a single connection between the controller and the at least one die. At 710, the method also provides for receiving the command from the controller and the data at the at least one die. At 712, the method provides for performing the command at the at least one die of the solid state drive.

Figure 8:
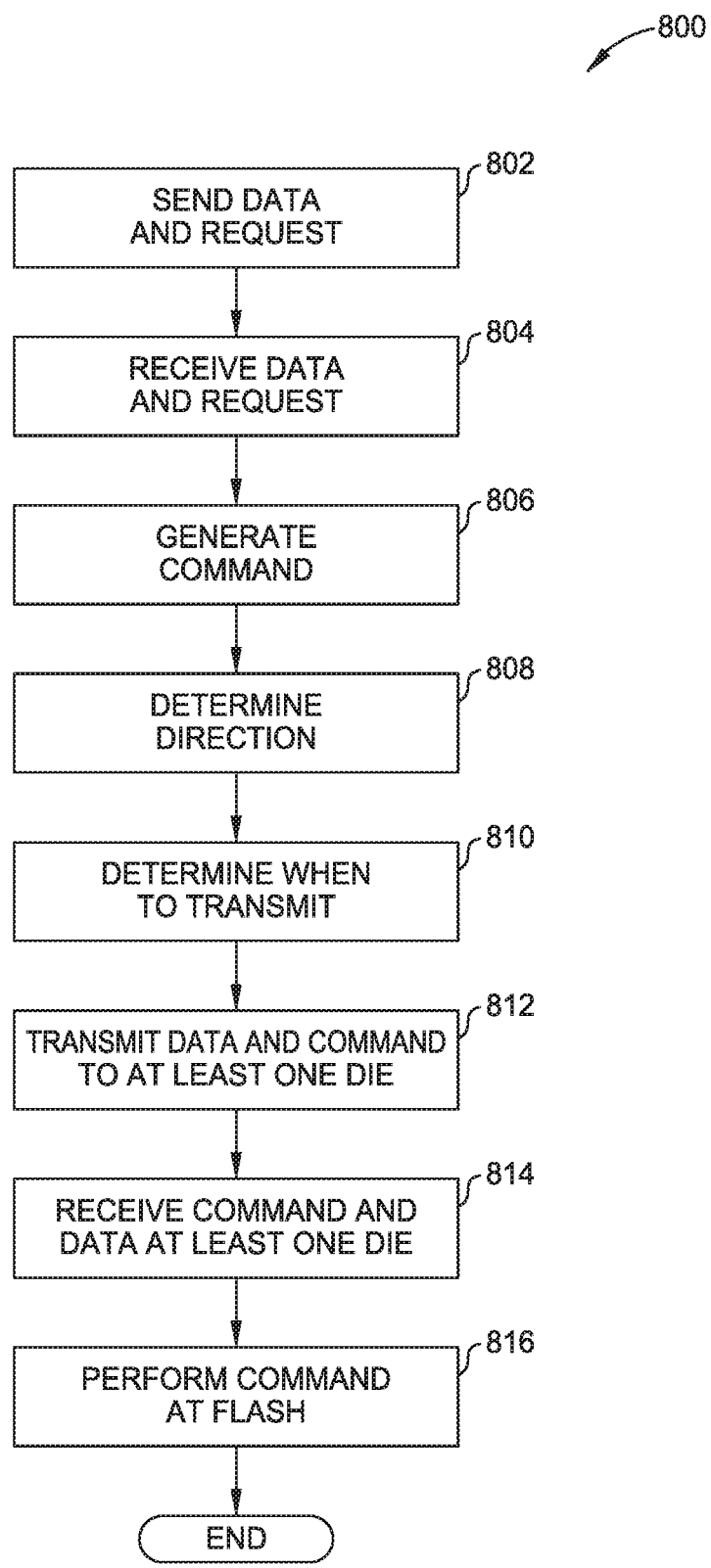
FIG. 8 is a flow chart for a method to perform a command and simultaneously send data to a multi-die flash memory arrangement.

Referring to FIG. 8 a method 800 to perform a command and simultaneously send data to a multi-die flash memory arrangement is disclosed. The method comprises, at 802, sending data and a request to perform a command from a host to the memory arrangement. At 804, the method provides for receiving the data and the request from the host at a controller connected to the multi-die flash memory arrangement. At 806, the method provides for generating a command at the controller to perform at the multi-die flash arrangement. At 808, the method provides for determining a direction of transmission of data over a single line connected to the controller and the multi-die flash arrangement. At 810, the method provides for determining when to transmit the command and data from the host according to a clock synchronization arrangement. At 812, the method provides for transmitting the command and data from the host to at least one die of the flash memory arrangement at a time determined by the clock synchronization arrangement, wherein the transmitting occurs over the common line a single connection between the controller and the at least one die. At 814, the method further provides for receiving the command from the controller and the data at the at least one die. At 816, the method further provides for performing the command at the at least one die of the flash memory arrangement.

In one example embodiment, an arrangement for providing a combined data and control signal for a multi die flash is disclosed comprising a memory arrangement, the memory arrangement comprising at least two dies, a controller configured to send and receive signals to the memory arrangement and a common line connected to the memory arrangement and the controller and configured to transmit the signals from the controller to the at least two dies, wherein the arrangement is configured to provide a combined data and combined control signals to the multi-die flash.

In another non-limiting embodiment, the arrangement may have four dies.

In another non-limiting embodiment, the arrangement may further comprise a digital to analog converter configured between the memory arrangement and the controller and an analog to digital converter for each of the at least two dies.

In another non-limiting embodiment, the arrangement may further comprise an analog to digital converter configured in the controller and a digital to analog converter in each of the at least two dies.

In another non-limiting embodiment, the controller may further comprise a clock synchronization arrangement configured to synchronize the signals transmitted from the controller to a clock signal.

In another non-limiting embodiment, the controller may further comprise a direction synchronization arrangement configured to specify a direction upon which the signals may travel on the common line.

In another non-limiting embodiment, the arrangement may be configured, wherein the memory is a flash memory.

In another non-limiting embodiment, the arrangement may be configured wherein the flash memory is a NAND flash memory.

In a still further embodiment, the arrangement may further comprise a resistor connected to ground between the digital to analog converter and the analog to digital converter.

In another embodiment, a method to operate a multi-die flash is disclosed comprising receiving data in a memory arrangement at a controller for the multi-die flash, wherein the data includes a request to perform a command at the memory arrangement, generating a command at the controller to perform at the multi-die flash, wherein separate command and separate data for at least two dies are combined in the generated command, transmitting the command from the controller to the at least two dies of the memory arrangement over a single line, receiving the command at the at least two dies and performing the command at the at least two dies of the memory arrangement.

In another embodiment, the method may be accomplished wherein the memory arrangement is a flash memory.

In another embodiment, the method may be accomplished wherein the flash memory is a NAND flash memory.

In another embodiment, the method may further comprise performing a digital to analog conversion of the transmitted command and data from the controller to at least one die of the memory arrangement over a single line.

In another embodiment, the method may further comprise performing an analog to digital conversion of the command and the data at the at least one die when received.

In a still further embodiment, the method may be performed wherein the performing the command at the at least one die of the memory arrangement is a write command.

In another embodiment, a memory arrangement is disclosed comprising means for receiving the data from the host at the controller for the multi-die flash, means for generating a command at the controller to perform at the multi-die flash, means for transmitting the command and data from the controller to at least one die of the memory arrangement over a single line, means for receiving the command and data at the at least one die and means for performing the command at the at least one die of the memory arrangement.

In another non-limiting embodiment, the memory arrangement may further comprise means for performing a digital to analog conversion of the transmitting the command and data from the controller to at least one die of the memory arrangement over the single line.

In a still further embodiment, the memory arrangement may further comprise means for performing an analog to digital conversion of the command and the data at the at least one die when received.

In a further embodiment, a method to perform a command and simultaneously send data to a multi-die solid state drive is disclosed comprising: receiving data including a request at a controller within the multi-die solid state drive, generating a command at the controller to perform at the multi-die solid state drive, transmitting the command and data from the host, over a single line, to at least two die of the solid state drive, receiving the command from the controller and the data at the at least two die and performing the command at the at least one die of the solid state drive.

In a still further embodiment, the method may be performed wherein the flash memory is a NAND flash memory.

In a further embodiment, the method may further comprise performing a digital to analog conversion of the transmitting the command and data from the host to at least two die of the memory arrangement.

In another embodiment, the method may further comprise performing an analog to digital conversion of the transmitting the command and data from the host to the at least two die of the memory arrangement when received.

In another embodiment, the performing the command at the at least two die of the memory arrangement is a write command.

In another embodiment, an arrangement to transmit a command and send data simultaneously perform to a multi-die memory arrangement, is disclosed comprising means for receiving the data and the request from the host at a controller connected to the multi-die memory arrangement, means for generating a command at the controller to perform at the multi-die flash, means for transmitting the command and data from the host to at least one die of the memory arrangement; wherein the transmitting occurs over a single connection between the controller and the at least one die and means for receiving the command from the controller and the data at the at least one die.

In another embodiment, the arrangement may further comprise means for performing a digital to analog conversion of the transmitting the command and data from the host to at least one die of the memory arrangement.

In another embodiment, the arrangement may further comprise means for performing an analog to digital conversion of the transmitting the command and data from the host to at least one die of the memory arrangement when received.

In another non-limiting embodiment, a method to perform a command and simultaneously send data to a multi-die flash memory arrangement, is disclosed comprising receiving the data including a request at a controller connected to the multi-die flash memory arrangement, generating a command at the controller to perform at the multi-die flash arrangement, determining a direction of transmission of data over a single line connected to the controller and the multi-die flash arrangement, determining when to transmit the command and data from a host according to a clock synchronization arrangement, transmitting the command and data from the host to at least two die of the flash memory arrangement at a time determined by the clock synchronization arrangement, wherein the transmitting occurs over the common line a single connection between the controller and the at least one die and the transmitting includes a combined control portion and a combined data portion, receiving the command from the controller and the data at the at least two die and performing the command at the at least two die of the flash memory arrangement.

In the embodiments provided any suitable type of memory may be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM") and other semiconductor elements capable of storing information may be used. Each type of memory device may have different configurations. For example, flash memory devices may be configured in a NAND or a NOR configuration.

The embodiments provided allow for providing methods and apparatus for combined data and control of multi-die flash arrangements. Such methods and apparatus provide advantages of faster response, reduced latency and overall improvement of memory systems that use and are arranged as illustrated.

While embodiments have been described herein, those skilled in the art, having benefit of this disclosure will appreciate that other embodiments are envisioned that do not depart from the inventive scope of the present application. Accordingly, the scope of the present claims or any subsequent related claims shall not be unduly limited by the description of the embodiments described herein.

What is claimed is:

1. An arrangement for providing a combined data and control signal for a multi die memory, comprising:
   a memory arrangement, the memory arrangement comprising at least two dies, each die of the at least two dies configured to receive a combined data and control signal comprising a plurality of signals, each of the plurality of signals being at a different voltage corresponding to one die of the at least two dies, the combined data and control signal comprising one or more of data signals or control signals;
   a controller configured to send and receive the combined data and control signal comprising the plurality of signals, to and from the memory arrangement; and
   a common line connected to the memory arrangement and the controller, configured to transmit the combined data and control signal from the controller to the at least two dies, wherein the arrangement is configured to provide the combined data and control signal to each respective one of the at least two dies in the multi die memory based on the voltage of each of the plurality of signals.

2. The arrangement according to claim 1, wherein there are four dies.

3. The arrangement according to claim 1, further comprising:
   a digital to analog converter configured between the memory arrangement and the controller; and
   an analog to digital converter for each of the at least two dies.

4. The arrangement according to claim 1, further comprising:
   an analog to digital converter configured in the controller; and
   a digital to analog converter in each of the at least two dies.

5. The arrangement according to claim 1, wherein the controller further comprises:
   a clock synchronization arrangement configured to synchronize the signals transmitted from the controller to a clock signal.

6. The arrangement according to claim 1, wherein the controller further comprises:
   a direction synchronization arrangement configured to specify a direction upon which the signals may travel on the common line.

7. The arrangement according to claim 1, wherein the memory is a flash memory.

8. The arrangement according to claim 7, wherein the flash memory is a NAND flash memory.

9. The arrangement according to claim 3, further comprising:
   a resistor connected to ground between the digital to analog converter and the analog to digital converter.

10. A method to operate a multi-die flash, comprising:
    receiving data in a memory arrangement at a controller for the multi-die flash, wherein the data includes a request to perform a command at the memory arrangement;
    generating a command at the controller to perform at the multi-die flash, wherein separate command and separate data for at least two dies are combined in the generated command;
    transmitting the command from the controller to the at least two dies of the memory arrangement over a single line at several voltage levels, each one of the several voltage levels corresponding to one die of the at least two dies;

receiving the command at the at least two dies and discerning between the separate command and separate data for each of the at least two dies based on voltage levels; and performing the command at the at least two dies of the memory arrangement.

11. The method according to claim 10, wherein the memory arrangement is a flash memory.

12. The method according to claim 11, wherein the flash memory is a NAND flash memory.

13. The method according to claim 10, further comprising:

performing a digital to analog conversion of the transmitted command and data from the controller to at least one die of the memory arrangement over a single line.

14. The method according to claim 13, further comprising:

performing an analog to digital conversion of the command and the data at the at least one die when received.

15. The method according to claim 10, wherein the performing the command at the at least two dies of the memory arrangement is a write command.

16. A memory arrangement, comprising:

means for receiving data from a host at a controller for a multi-die flash;

means for generating a command at the controller to perform at the multi-die flash;

means for transmitting the command and data from the controller to at least two die of the memory arrangement over a single line at two voltage levels, each of the two voltage levels corresponding to one of the at least two die of the memory arrangement;

means for discerning the voltage from the at least two voltage levels and receiving the command and data at each of the at least two die; and means for performing the command at the at least two die of the memory arrangement.

17. The memory arrangement according to claim 16, further comprising:

means for performing a digital to analog conversion of the transmitting the command and data from the controller to at least one die of the memory arrangement over the single line.

18. The memory arrangement according to claim 17, further comprising:

means for performing an analog to digital conversion of the command and the data at the at least one die when received.

19. A method to perform a command and simultaneously send data to a multi-die solid state drive, comprising:

receiving data including a request at a controller within the multi-die solid state drive;

generating a command at the controller to perform at the multi-die solid state drive;

transmitting the command and data from the controller at least two different voltage levels on a signal comprising multiple voltages, over a single line, to at least two die of the solid state drive;

receiving the command from the controller and the data at the at least two die and discerning one of the at least two different voltage levels from the multiple voltages at each of the at least two die; and performing the command at the at least two die of the solid state drive.

20. The method according to claim 19, wherein the solid state drive includes NAND flash memory.

21. The method according to claim 19, further comprising:

performing a digital to analog conversion of the transmitting the command and data from the controller to at least two die of the solid state drive.

22. The method according to claim 21, further comprising:

performing an analog to digital conversion of the transmitting the command and data from the controller to the at least two die of the solid state drive when received.

23. The method according to claim 19, wherein the performing the command at the at least two die of the solid state drive is a write command.

24. An arrangement to transmit a command and send data simultaneously perform to a multi-die memory arrangement, comprising:

means for receiving the data and a request from a host at a controller connected to the multi-die memory arrangement;

means for generating a command at the controller to perform at the multi-die memory arrangement;

means for transmitting the command and data from the controller at a voltage on a signal comprising multiple voltages, each voltage of the multiple voltages corresponding to one die of the multi-die memory arrangement; wherein the transmitting occurs over a single connection between the controller and the at least one die; and means for discerning the voltage from the multiple voltages and receiving the command from the controller and the data at the at least one die.

25. The arrangement according to claim 24, further comprising:

means for performing a digital to analog conversion of the transmitting the command and data from the controller to at least one die of the memory arrangement.

26. The arrangement according to claim 24, further comprising:

means for performing an analog to digital conversion of the transmitting the command and data from the controller to at least one die of the memory arrangement when received.

27. A method to perform a command and simultaneously send data to a multi-die flash memory arrangement, comprising:

receiving the data including a request at a controller connected to the multi-die flash memory arrangement;

generating a command at the controller to perform at the multi-die flash memory arrangement;

determining a direction of transmission of data over a single line connected to the controller and the multi-die flash memory arrangement;

determining when to transmit the command and data from a controller according to a clock synchronization arrangement;

determining a voltage at which to transmit the command and data from the controller, as part of a multi-voltage signal;

transmitting the command and data from the controller to at least two die of the flash memory arrangement at a time determined by the clock synchronization arrangement wherein the voltage is discernable by one of the at least two die, wherein the transmitting occurs over a common line a single connection between the controller and the at least two die and the transmitting includes a combined control portion and a combined data portion;

receiving the command from the controller and the data at the at least two die; and performing the command at the at least two die of the flash memory arrangement.

\* \* \* \* \*